(12) United States Patent
Godet

(10) Patent No.: US 11,182,990 B2
(45) Date of Patent: Nov. 23, 2021

(54) METHOD AND DEVICE FOR DETERMINING A TIME OF ARRIVAL OF A RADIO SIGNAL

(71) Applicants: Continental Automotive France, Toulouse (FR); Continental Automotive GmbH, Hannover (DE)

(72) Inventor: Sylvain Godet, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/276,604

(22) PCT Filed: Sep. 20, 2019

(86) PCT No.: PCT/EP2019/075350
§ 371 (c)(1),
(2) Date: Mar. 16, 2021

(87) PCT Pub. No.: WO2020/058486
PCT Pub. Date: Mar. 26, 2020

(65) Prior Publication Data
US 2021/0312731 A1 Oct. 7, 2021

(30) Foreign Application Priority Data
Sep. 21, 2018 (FR) ...................................... 1858599

(51) Int. Cl.
*G07C 9/00* (2020.01)
*G01S 5/02* (2010.01)
(Continued)

(52) U.S. Cl.
CPC ........ *G07C 9/00309* (2013.01); *G01S 5/0221* (2013.01); *G01S 7/2921* (2013.01); *G01S 13/767* (2013.01); *G07C 2209/63* (2013.01)

(58) Field of Classification Search
CPC ............ G07C 9/00309; G07C 2209/63; G01S 5/0221; G01S 7/2921; G01S 13/767
See application file for complete search history.

(56) References Cited

U.S. PATENT DOCUMENTS

| 9,618,603 B2* | 4/2017 | Ben-Haim | ............ H04L 7/0033 |
| 2012/0163125 A1* | 6/2012 | Pochon | ................... G01S 7/023 367/99 |

(Continued)

FOREIGN PATENT DOCUMENTS

WO 2005114593 A1 12/2005

OTHER PUBLICATIONS

International Search Report and Written Opinion for International Application No. PCT/EP2019/075350, dated Dec. 5, 2019, with partial English translation, 8 pages.
(Continued)

*Primary Examiner* — Thomas D Alunkal
(74) *Attorney, Agent, or Firm* — RatnerPrestia

(57) ABSTRACT

A reception device for receiving a radio signal, designed to estimate a time of arrival of the radio signal. The reception device includes a reception module designed to receive the radio signal, and a detection module configured so as to: measure a current supplied by an electric power source to the reception module, detect a current peak measured by the detection module, the current peak being caused by the reception of the radio signal by the reception module, and determine the time of arrival of the radio signal on the basis of the time of detection of the detected current peak.

15 Claims, 4 Drawing Sheets

(51) Int. Cl.
*G01S 13/76* (2006.01)
*G01S 7/292* (2006.01)

(56) References Cited

U.S. PATENT DOCUMENTS

| | | | | |
|---|---|---|---|---|
| 2012/0262340 | A1* | 10/2012 | Hassan | G01S 11/08 |
| | | | | 342/458 |
| 2014/0029498 | A1* | 1/2014 | Kim | H04W 52/0277 |
| | | | | 370/311 |
| 2015/0382140 | A1* | 12/2015 | Cho | G01S 5/0231 |
| | | | | 455/457 |
| 2016/0077200 | A1* | 3/2016 | Hassan | G01S 11/08 |
| | | | | 342/458 |
| 2016/0259304 | A1* | 9/2016 | Fujisawa | G04C 10/04 |

OTHER PUBLICATIONS

International Search Report and Written Opinion for International Application No. PCT/EP2019/075350, dated Dec. 5, 2019, 14 pages (French).
English translation of Written Opinion for International Application No. PCt/EP2019/075350, dated Dec. 5, 2019, 7 pages.

* cited by examiner

METHOD AND DEVICE FOR DETERMINING A TIME OF ARRIVAL OF A RADIO SIGNAL

CROSS REFERENCE TO RELATED APPLICATIONS

This application is the U.S. National Phase Application of PCT International Application No. PCT/EP2019/075350, filed Sep. 20, 2019, which claims priority to French Patent Application No. 1858599, filed Sep. 21, 2018, the contents of such applications being incorporated by reference herein.

FIELD OF THE INVENTION

The present invention relates in particular to a device and to a method for accurately determining the time of arrival of a radio signal in order to estimate the distance between a transmitter and a receiver of said radio signal. The invention is particularly well suited for implementing a "hands-free" access system for accessing a motor vehicle.

BACKGROUND OF THE INVENTION

A "hands-free" access system for accessing a motor vehicle allows a user to lock and/or unlock the opening elements of his vehicle or else to start the vehicle without using a key. To this end, the vehicle identifies a mobile transmitter carried or worn by the user (such as a fob or a remote control) when said mobile transmitter is detected close to or inside the vehicle.

Such a "hands-free" access system is known to those skilled in the art. It generally involves radio communication between a control module housed on board the vehicle and a mobile transmitter such as a fob or a remote control.

An identification procedure between the mobile transmitter and the control module of the vehicle allows the vehicle to authenticate the mobile transmitter and makes it possible to trigger the locking/unlocking of the opening elements or to start the vehicle.

The identification procedure is generally carried out using a radio signal conveyed by electromagnetic waves whose frequency is between 30 kHz and 300 kHz (LF or "low frequency" radio waves).

The identification procedure is implemented only if the mobile transmitter is detected beforehand close to the vehicle (for locking/unlocking an opening element) or else inside the vehicle (for starting).

The distance between the mobile transmitter and the vehicle is for example estimated by the control module based on a measurement of a power level received by the control module when a signal transmitted by the transmitter device is received. Such a measurement of a received power level is commonly called an RSSI ("received signal strength indication") measurement. The power level received by the control module for a signal transmitted by the mobile transmitter specifically generally varies in a known manner on the basis of the distance between the control module and the mobile transmitter.

An LF radio signal exhibits relative stability in terms of the power level received by a receiver for a signal transmitted by a transmitter at a given position. In other words, if a plurality of RSSI measurements are performed at various times and under various conditions for one and the same position of the transmitter, all of the measurements will vary only by a few decibels. The accuracy of the estimate of the distance between the mobile transmitter and the vehicle based on a measurement of a power level received by the control module is thus generally acceptable for signals transmitted on LF radio waves.

It may however be advantageous for the mobile transmitter to be a mobile telephone or a watch carried or worn by the user.

If the mobile transmitter is a mobile telephone, it is generally not possible to communicate with the control module of the vehicle in an LF frequency band, since most mobile telephones do not have LF communications means.

On the other hand, mobile telephones are nowadays equipped with the Bluetooth® communication standard, possibly available in its low-energy version ("Bluetooth® Low Energy" or BLE in the literature). This is a radio communication standard using frequencies varying between 2.402 GHz and 2.480 GHz. These frequencies belong to what is called the UHF (ultra-high frequency) frequency band, which conventionally encompasses frequencies between 300 MHz and 3 GHz.

It therefore becomes necessary to adapt the "hands-free" access and/or starting system for accessing and/or starting a motor vehicle so that it is also able to operate for signals exchanged on the UHF frequency band, and no longer only for signals conveyed by LF low-frequency radio waves.

A UHF radio signal, transmitted for example by a transmitter using the Bluetooth® communication standard, is however particularly sensitive to environmental parameters (humidity, interference with other communication systems using nearby frequency bands such as for example Wi-Fi®, presence of obstacles to the propagation of the signal, etc.). In addition, the RSSI value depends on the frequency that is used and may vary on the basis of a communication channel that is used (for example with Bluetooth®, various signaling channels at various frequencies may be used, and the RSSI value observed for a given position of the transmitter will depend on the channel that is used, and may thus be subject to significant variations from one measurement to another on the basis of the channel that is used). In other words, if a plurality of RSSI measurements are performed at various times and under various conditions for one and the same position of the transmitter, all of the measurements may vary by several tens of decibels. It is then generally no longer possible to sufficiently accurately estimate the distance between the mobile transmitter and the vehicle based on a measurement of a power level received by the control module.

Another solution for estimating the distance between the mobile transmitter and the vehicle consists for example in measuring the propagation time of a radio signal transmitted by the mobile transmitter and received by the control module of the vehicle. The radio signal propagates at the speed of light, and it is possible to calculate the distance between the mobile transmitter and the vehicle based on the propagation time of the signal between the mobile transmitter and the control module.

This solution based on the time of flight, as it is known in the literature, of the signal however assumes that it is possible to determine the time of departure and the time of arrival of the signal with sufficient accuracy.

However, the frequency of the internal clock of a component based on Bluetooth® technology is generally 24 MHz, thereby giving a temporal granularity of approximately 42 ns. For a signal traveling at the speed of light, that is to say approximately $3.10^8$ m/s, this represents an accuracy error of approximately 12.5 m in terms of the distance calculation. Such a solution is then not satisfactory for managing access to a motor vehicle (a resolution of less than two meters is desirable for such an application).

One known solution for accurately determining the time of arrival of a radio signal received by a receiver device consists in integrating, in said receiver device, a detection module clocked by a high-frequency clock (whose frequency is for example at least equal to 150 MHz). The detection module is configured so as to measure a power level received at an antenna of the receiver device and to detect a power peak corresponding to the arrival of the signal. However, such a solution is particularly expensive and generally does not work for received power levels lower than −48 dBm, this being prohibitive for a large number of applications since, in this case, the detection region is very small.

SUMMARY OF THE INVENTION

An aspect of the present invention aims to rectify all or some of the drawbacks from the prior art, in particular those described above, by proposing a solution that is easy to implement and that makes it possible to determine a time of arrival of a radio signal with sufficient accuracy, even for relatively low received power levels of the radio signal.

To this end, and according to a first aspect, the present invention proposes a method for estimating a time of arrival of a radio signal received by a reception device. The reception device comprises a reception module designed to receive said radio signal and a detection module configured so as to measure a current supplied by an electric power source to the reception module. The method for estimating the time of arrival of the radio signal comprises the following steps:
  detecting a current peak measured by the detection module, said current peak being caused by the reception of the radio signal by the reception module,
  determining the time of arrival of the radio signal on the basis of the time of detection of the detected current peak.

Such provisions then make it possible to estimate the distance between a transmitter of the radio signal and the reception device. For example, if the time of departure of the radio signal is known, it is possible to calculate the time of flight of the radio signal between the transmitter and the receiver device and to deduce therefrom the distance covered by the radio signal during said time of flight. According to another example, if a plurality of reception devices receive one and the same radio signal transmitted by a transmitter, TDOA (acronym for "time difference of arrival") methods make it possible to estimate the distance between the transmitter and a receiver device based on the differences between the respective times of arrival of the radio signal at each receiver device.

In contrast to some solutions from the prior art, the detection of the time of arrival of the radio signal does not depend on decoding of said radio signal, thereby making it possible to avoid constraints linked to the clock frequency of the reception module for receiving the signal.

Therefore, in contrast to other solutions from the prior art, the detection of the time of arrival of the radio signal is not based on a measurement of a received power level for the radio signal, thereby making it possible to obtain a particularly accurate estimate of the time of arrival of the radio signal, even for relatively low power levels of the radio signal, and in particular power levels of the order of −95 dBm.

The proposed solution is furthermore particularly easy to implement and inexpensive.

In particular modes of implementation, the current peak is detected when the current measured by the detection module becomes greater than a predetermined threshold.

It should be noted that other criteria for detecting a current peak could be contemplated, for example if the measured current exhibits a slope greater than a certain value.

According to a second aspect, the present invention relates to a reception device for receiving a radio signal, designed to estimate a time of arrival of said radio signal. The reception device comprises a reception module designed to receive the radio signal, and a detection module configured so as to:
  measure a current supplied by an electric power source to the reception module,
  detect a current peak measured by the detection module, said current peak being caused by the reception of the radio signal by the reception module,
  determine the time of arrival of the radio signal on the basis of the time of detection of the detected current peak.

In particular embodiments, the reception module is clocked by a clock, called "reception clock", the detection module is clocked by a clock, called "detection clock", which has a frequency greater than the reception clock, and the time of arrival of the radio signal is determined by identifying an edge of the detection clock corresponding to the time of detection of the detected current peak.

The higher the frequency of the detection clock, the greater the accuracy of the estimate of the time of arrival of the radio signal will be, and therefore the better the accuracy of the estimate of the distance between the transmitter and the receiver device will be. The estimate of the time of arrival of the radio signal does not depend on the frequency of the reception clock.

According to a third aspect, the present invention relates to a method for estimating the distance between a first communication device, called "master device", and a second communication device, called "slave device". The master device and the slave device each comprise a communication module designed to transmit and receive a radio signal. The master device furthermore comprises a detection module configured so as to measure a current supplied by an electric power source to the communication module. The distance estimation method comprises the following steps:
  the master device transmitting a radio signal carrying a request to the slave device,
  determining a time of departure of the radio signal carrying the request,
  the slave device transmitting a radio signal carrying a response to the master device, said response being transmitted after a predetermined response period following the reception of the radio signal carrying the request,
  the detection module of the master device detecting a current peak measured by the detection module, called "current peak at reception", said current peak at reception being caused by the reception, by the communication module of the master device, of the radio signal carrying the response transmitted by the slave device,
  determining a time of arrival of the radio signal carrying the response on the basis of the time of detection of the current peak at reception,
  estimating the distance between the master device and the slave device based on the time of departure, on the time of arrival and on the predetermined response period.

With such provisions, the time of departure and the time of arrival that make it possible to estimate the distance between two communication devices are determined by the same device, specifically the master device. There is then no need for any clock synchronization between the master device and the slave device.

According to a fourth aspect, the present invention relates to a communication device, called "master device", designed to estimate a distance between said master device and another communication device, called "slave device". The master device comprises a communication module designed to transmit and receive a radio signal and a detection module configured so as to measure a current supplied by an electric power source to the communication module. The master device is configured so as to:

transmit a radio signal carrying a request to the slave device, determine a time of departure of the radio signal carrying the request, detect a current peak measured by the detection module, called "current peak at reception", said current peak at reception being caused by the reception, by the communication module, of a radio signal carrying a response transmitted by the slave device after a predetermined response period following the reception of the radio signal carrying said request, determine a time of arrival of the radio signal carrying the response on the basis of the time of detection of the current peak at reception, estimate the distance between the master device and the slave device based on the time of departure, the time of arrival and the predetermined response period.

In particular embodiments, the invention may furthermore comprise one or more of the following features, taken alone or in any technically feasible combination.

In particular embodiments, the master device is furthermore configured so as to detect a current peak measured by the detection module, called "current peak at transmission", said current peak at transmission being caused by the transmission of the radio signal carrying the request by the communication module, and to determine the time of departure of the radio signal carrying the request on the basis of the time of detection of the current peak at transmission.

In particular embodiments, the communication module of the master device is clocked by a clock, called "communication clock", the detection module is clocked by a clock, called "detection clock", which has a frequency greater than the communication clock, and the time of departure and the time of arrival are determined by identifying an edge of the detection clock corresponding respectively to the time of detection of the current peak at transmission and to the time of detection of the current peak at reception.

In particular embodiments, the radio signals exchanged between the master device and the slave device are signals whose frequency is greater than 300 MHz.

In particular embodiments, the radio signals exchanged between the master device and the slave device comply with a Bluetooth Low Energy communication standard.

According to a fifth aspect, the present invention relates to an access system for accessing a motor vehicle. The access system comprises a master device according to any one of the preceding embodiments and a slave device. Access to the vehicle is authorized when the distance between the master device and the slave device estimated by the master device is less than a predetermined distance.

In particular embodiments, the master device is housed on board the motor vehicle and the slave device is intended to be carried or worn by a user.

In particular embodiments, the slave device is housed on board the motor vehicle and the master device is intended to be carried or worn by a user.

In particular embodiments, the slave device is a mobile telephone.

According to a sixth aspect, the present invention relates to a motor vehicle comprising a master device according to any one of the preceding embodiments for estimating the distance between the master device and a slave device intended to be carried or worn by a user. Access to the vehicle is authorized for the user when the distance between the master device and the slave device estimated by the master device is less than a predetermined distance.

BRIEF DESCRIPTION OF THE DRAWINGS

Aspects of the present invention will be better understood upon reading the following description, given by way of entirely non-limiting example and with reference to FIGS. 1 to 8, in which.

In these figures, references that are identical from one figure to another denote identical or analogous elements. For the sake of clarity, the elements that are shown are not necessarily to the same scale, unless stated otherwise.

DETAILED DESCRIPTION OF THE PREFERRED EMBODIMENTS

As indicated above, an aspect of the present invention aims to make it possible to accurately determine a time of arrival of a radio signal in order to be able to estimate the distance between a transmitter and a receiver of said radio signal.

In the remainder of the description, consideration is given, without limitation, to the case in which radio signals are exchanged between a motor vehicle and a terminal intended to be carried or worn by a user (for example a fob, a remote control, a mobile telephone, a connected watch, etc.). One aim of an aspect of the invention is to accurately determine a time of arrival of a radio signal exchanged between the terminal and the vehicle in order to estimate the distance between the vehicle and the terminal based on a time of flight of the signal.

For example, in order to be able to access the motor vehicle, the estimated distance between the vehicle and the terminal carried or worn by the user should be less than a predetermined value, for example a few meters. If this is the case, the opening elements of the vehicle are unlocked. If not, the opening elements of the vehicle are locked. In the example under consideration, the accuracy error in the estimate of the distance between the vehicle and the terminal should be less than two meters.

In the remainder of the description, consideration is given, without limitation, to the case in which the radio signals under consideration have a frequency greater than 300 MHz. More particularly, consideration is given by way of example to the case in which the terminal is a mobile telephone and the radio signals under consideration are in accordance with the Bluetooth® communication standard, possibly available in its low-energy version ("Bluetooth® Low Energy" or BLE in the literature). This is a radio communication standard using frequencies varying between 2.402 GHz and 2.480 GHz.

Figure 1:
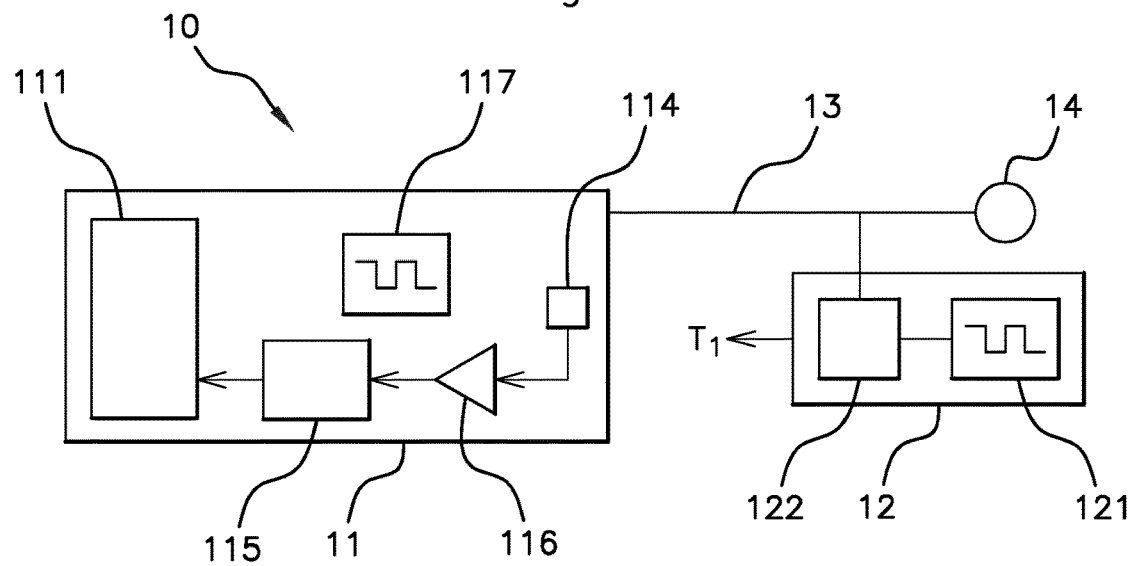
FIG. 1 shows a schematic depiction of a reception device for receiving a radio signal, designed to estimate a time of arrival of the signal.

FIG. 1 schematically shows a reception device 10 for receiving a radio signal, designed to estimate a time of arrival $T_1$ of said signal.

Such a reception device 10 may for example be integrated in the motor vehicle or else in the terminal, depending on whether it is desired for the time of arrival of a radio signal received by said reception device 10 to be determined in the vehicle or in the terminal.

The reception device 10 comprises a reception module 11 designed to receive said radio signal and that comprises, as is conventional, an antenna 114, a low-noise amplifier 116 (LNA in the literature), a demodulator 115 and a baseband processor 111.

The demodulator 115 comprises hardware and/or software means for processing the signal, considered to be known to those skilled in the art (analog and/or digital filter, local oscillator, mixer, analog-to-digital converter, signal processing processor, etc.), in order to provide the baseband processor 111 with a binary signal based on an analog signal received at the antenna 114 and shaped by the low-noise amplifier 116.

The reception module 11 is for example clocked by a clock 117 internal to the reception module 11, called "reception clock 117". In the example under consideration, in which the reception module 11 is a Bluetooth® communication module, the frequency of this reception clock 117 is conventionally equal to 24 MHz. The time period of an edge of this reception clock 117 is then approximately 42 ns. As explained above, a temporal granularity of approximately 42 ns is then not sufficiently accurate to estimate the time of arrival $T_1$ of a radio signal for the purpose of calculating the time of flight of the signal in order to deduce therefrom the distance covered by the signal between the vehicle and the terminal. Specifically, since the radio signal propagates at the speed of light, a granularity of 42 ns in terms of the time of arrival of the signal corresponds to an accuracy error of more than twelve meters in terms of the estimate of the distance between the vehicle and the terminal, whereas an accuracy error of less than two meters is desirable for the application under consideration.

The reception device 10 also comprises an electric power source 14 that supplies the reception module 11 with an electric current via a supply line 13. The power consumption of the reception module 11, and therefore the strength of the electric current in the supply line 13, vary on the basis of the activities of the reception module 11.

The reception device 10 also comprises a detection module 12 comprising a measuring instrument 122 for measuring the strength of the electric current flowing in the supply line 13. The detection module 12 is for example clocked by a clock, called "detection clock 121". Advantageously, the frequency of the detection clock 121 is greater than the frequency of the reception clock 117. For example, the frequency of the detection clock 121 is at least equal to 150 MHz, this corresponding to a period of approximately 6.7 ns. The distance covered during one period of the detection clock 121 by a radio signal traveling at the speed of light is then approximately two meters.

The detection module 12 is configured so as to measure the strength of the supply current of the reception module 11. The detection module 12 is also configured so as to detect a current peak, said current peak being caused by the reception of a radio signal by the reception module 11. For example, said current peak is detected when the strength of the current measured by the measuring instrument 122 of the detection module 12 is greater than a predetermined threshold. To this end, the detection module 12 comprises hardware and/or software means (processors, memories, program code instructions, programmable logic circuits such as FPGAs, PLDs, etc., specialized integrated circuits such as ASICs, etc.) considered to be known to those skilled in the art in order to store and analyze measurements of the strength of the current flowing in the supply line 13.

Specifically, it is possible to determine a singular and repeatable signature of the variation in the strength of the current in the supply line 13 when a radio signal intended for the reception module 11 is received by the antenna 114 and then processed by the various elements of the reception chain, in particular the low-noise amplifier 116, the demodulator 115 and the baseband processor 111. The low-noise amplifier 116 in particular has a high power consumption, and it is this that contributes primarily to creating this specific signature of the current measured in the supply line 113 when a radio signal is received. In particular, it is possible to detect a first current peak in this signature for which the amplitude of the strength of the measured current is greater than a predetermined threshold. This current peak corresponds to the start of reception of the radio signal by the reception module 11.

Figure 2:
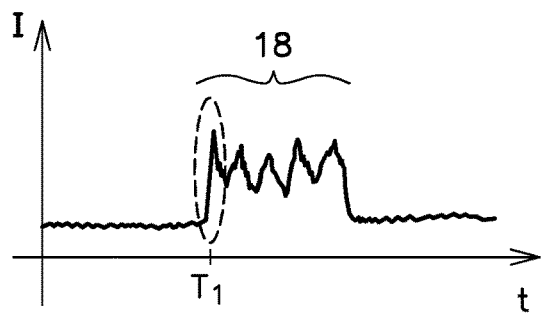
FIG. 2 shows a schematic depiction of the variation, as a function of time, in the strength of the electric current supplied to a reception module when a radio signal is received.

FIG. 2 schematically shows the variation in the strength of the electric current supplied to the reception module 11. The strength of the electric current is shown on the ordinate axis, while time is shown on the abscissa axis. Part 18 of the curve corresponds to the characteristic signature of the electric current when a radio signal intended for the reception module 11 is received by the reception module 11. The current peak corresponding to the start of reception of the radio signal by the reception module 11 is surrounded by dashed lines. The time of detection of this current peak makes it possible to determine the time of arrival $T_1$ of the radio signal.

It should be noted that this current peak corresponding to the time of arrival $T_1$ of a radio signal at the reception module 11 is observed even for particularly low power levels of the signal, for example for power levels of the order of −95 dBm (this corresponding to a typical sensitivity level of a BLE receiver).

It is then possible to determine a time of arrival $T_1$ of the radio signal on the basis of the time of detection of the current peak. For example, the time of arrival $T_1$ of the received radio signal is determined by identifying an edge of the detection clock 121 corresponding to the time of detection of the detected current peak. The detection module 12 comprises for example a counter for counting the rising edges of the detection clock 121, and the number $N_1$ of the rising edge closest to the moment when the current peak occurs is identified.

If it is assumed that the number $N_0$ of the rising edge of the detection clock 121 corresponding to the moment when the signal was transmitted is also known, it is possible to calculate the time of flight of the signal as being the time elapsed between these two rising edges. The time of flight is then equal to the number of rising edges between No (which corresponds to the transmission of the signal) and $N_1$ (which corresponds to the reception of the signal) multiplied by the period of the detection clock 121, that is to say $(N_1-N_0) \times 1/F$, if F denotes the frequency of the detection clock 121. For example, if the transmitter of the radio signal has a clock synchronized with the detection clock 121 of the reception device 10, then it may include the value of No in a message carried by said signal.

It will then be understood that the higher the frequency of the detection clock 121, the more accurate the calculation of the time of flight of the signal. In particular, with a frequency of 150 MHz, it is possible to obtain an accuracy of the order of 6.7 ns in terms of the calculation of the time of flight.

Based on the time of flight of the signal, and in the knowledge that the radio signal travels at the speed of light, it is possible to estimate the distance covered by the signal between the transmitter and the receiver. With a frequency at least equal to 150 MHz for the detection clock 121, it is then possible to obtain an accuracy error less than or equal to two meters for the estimate of this distance. Such accuracy is acceptable for the application under consideration, specifically the management of access to a motor vehicle by detecting the presence of a user close to the vehicle.

It should be noted that, if a plurality of reception devices 10 identical to the one described with reference to FIG. 1 are used and receive one and the same radio signal transmitted by a transmitter, then it is possible, using known "time difference of arrival" (TDOA in the literature) methods, to estimate the distance between the transmitter of the signal and a reception device even if the time of departure of the radio signal is not accurately known.

Figure 3:
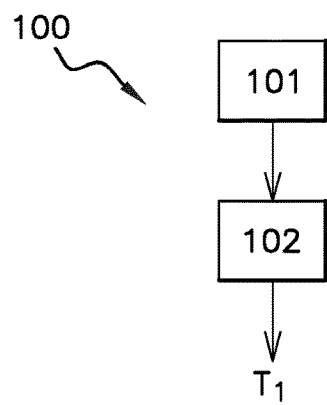
FIG. 3 shows a schematic depiction of the main steps of a method for estimating a time of arrival of a radio signal.

FIG. 3 schematically shows the main steps of a method 100 for estimating the time of arrival $T_1$ of a radio signal received by the reception device 10. Such a method is for example implemented by the reception device 10 described with reference to FIG. 1.

The method 100 comprises in particular a step 101 of detecting a current peak measured by the detection module 12, said current peak being caused by the reception of the radio signal by the reception module 11. For example, said current peak is detected when the strength of the current measured by the measuring instrument 122 of the detection module 12 is greater than a predetermined threshold.

The method 100 also comprises a step 102 of determining the time of arrival $T_1$ of the radio signal, for example by identifying an edge of the detection clock 121 corresponding to the time of detection of the detected current peak.

As explained above, based on the time of arrival $T_1$ of the radio signal, if the time of departure $T_0$ when the signal is transmitted is also known, it is possible to determine the distance between a transmitter and the reception device 10.

It should be noted that it is also possible, in a subsequent step that is not shown, to confirm, in the baseband processor, that the received radio signal did actually carry a particular message transmitted for the purpose of calculating a time of flight of the signal in order to deduce therefrom a distance between the transmitter and the reception device 10. For example, a period between the detection of the time of arrival $T_1$ of the signal by the detection module 12 and the decoding of a message, carried by said signal, by the baseband processor 111 should be less than a predetermined duration, for example a few microseconds.

Figure 4:
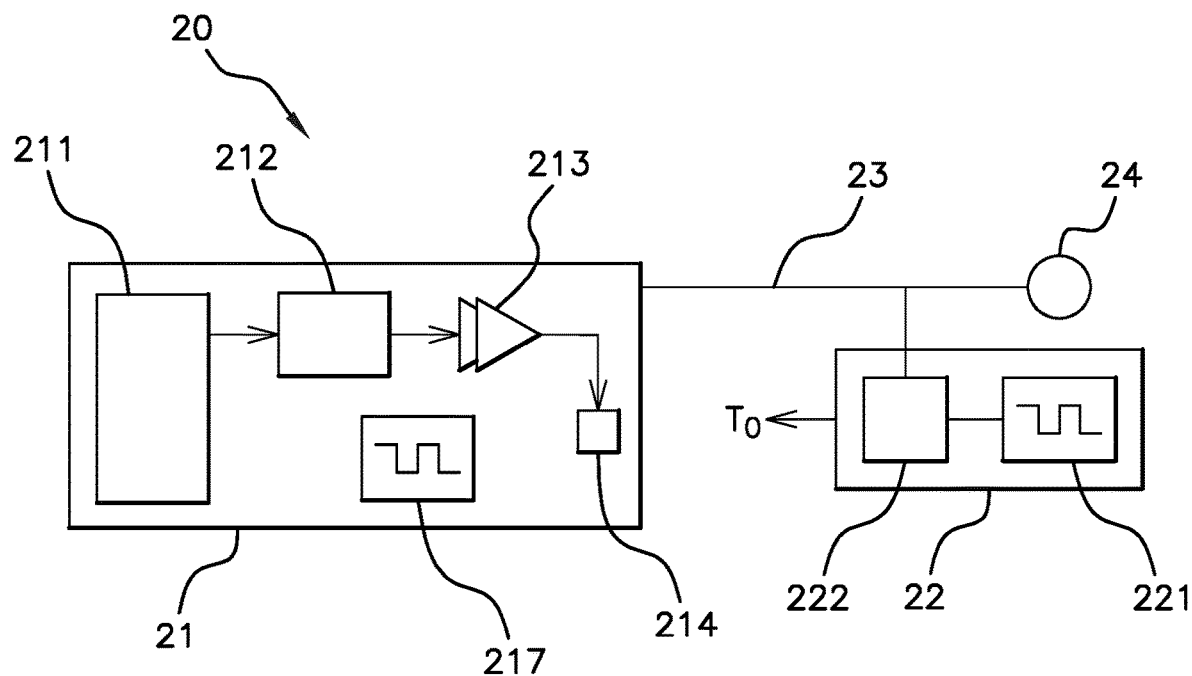
FIG. 4 shows a schematic depiction of a transmission device for transmitting a radio signal, designed to estimate a time of departure of the signal.

FIG. 4 schematically shows a transmission device 20 for transmitting a radio signal, designed to estimate a time of departure $T_0$ of said signal.

Such a transmission device 20 may for example be integrated in the motor vehicle or else in the terminal, depending on whether it is desired for the time of departure $T_0$ of a radio signal transmitted by said transmission device 20 to be determined in the vehicle or in the terminal.

The transmission device 20 comprises a transmission module 21 that comprises, as is conventional, a baseband processor 211, a modulator 212, a power amplifier 213, as it is known in the literature, and an antenna 214.

The modulator 212 comprises hardware and/or software means for processing the signal, considered to be known to those skilled in the art (analog and/or digital filter, local oscillator, mixer, analog-to-digital converter, signal processing processor, etc.), in order to generate an analog signal based on a binary signal supplied by the baseband processor 211. This analog signal is then amplified by the power amplifier 213 and transmitted by the antenna 214.

The transmission module 21 is for example clocked by a clock 217 internal to the transmission module 21, called "transmission clock 217". In the example under consideration, in which the transmission module 21 is a Bluetooth® communication module, the frequency of this transmission clock 217 is conventionally equal to 24 MHz. As explained above, the temporal granularity of approximately 42 ns offered by this transmission clock 217 is then not acceptable for estimating the distance between the vehicle and the terminal with sufficient accuracy.

The transmission device 20 also comprises an electric power source 24 that supplies the transmission module 21 with an electric current via a supply line 23. The power consumption of the transmission module 21, and therefore the strength of the electric current in the supply line 23, vary on the basis of the activities of the transmission module 21.

The transmission device 20 also comprises a detection module 22 comprising a measuring instrument 222 for measuring the strength of the electric current flowing in the supply line 23. The detection module 22 is for example clocked by a clock, called "detection clock 221". Advantageously, the frequency of the detection clock 221 is greater than the frequency of the transmission clock 217. For example, the frequency of the detection clock 221 is at least equal to 150 MHz.

The detection module 22 is configured so as to measure the strength of the supply current of the transmission module 21. The detection module 22 is also configured so as to detect a current peak, said current peak being caused by the transmission of a radio signal by the transmission module 21. For example, said current peak is detected when the strength of the current measured by the measuring instrument 222 of the detection module 22 is greater than a predetermined threshold. To this end, the detection module 22 comprises hardware and/or software means (processors, memories, program code instructions, programmable logic circuits such as FPGAs, PLDs, etc., specialized integrated circuits such as ASICs, etc.) considered to be known to those skilled in the art in order to store and analyze measurements of the strength of the current flowing in the supply line 23.

The strength of the current in the supply line 23 varies with a singular and repeatable signature when a radio signal is transmitted by the transmission module 21 through the various elements of the transmission chain, in particular the baseband processor 211, the modulator 212 and the power amplifier 213. In particular, it is possible to detect a first current peak in this signature for which the strength of the measured current is greater than a predetermined threshold. This peak corresponds to the start of the transmission of the radio signal by the transmission module 21.

It is then possible to determine a time of departure $T_0$ of the transmitted radio signal, for example by identifying an edge of the detection clock 221 corresponding to the time of the detected current peak. For example, the detection module 22 comprises a counter for counting the rising edges of the detection clock 221, and the number $N_0$ of the rising edge closest to the moment when the current peak occurs is identified.

If it is assumed that the number $N_1$ of the rising edge of the detection clock 221 corresponding to the moment when the signal is received by a receiver intended to receive the signal is also known, then it is possible to calculate the time of flight of the signal as being $(N_1-N_0) \times 1/F$, F being the frequency of the detection clock 221.

The higher the frequency of the detection clock 221, the more accurate the calculation of the time of flight of the signal, and the more accurate the estimate of the distance between the transmission device 20 and the receiver. In particular, with a frequency of 150 MHz, it is possible to obtain an accuracy of the order of two meters for the estimate of this distance.

Figure 5:
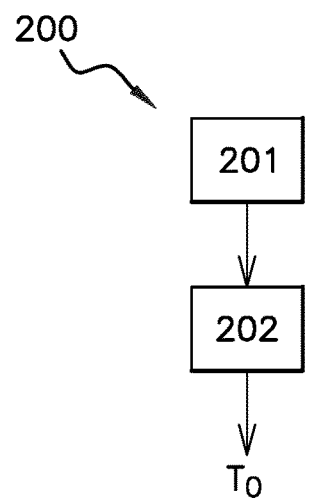
FIG. 5 shows a schematic depiction of the main steps of a method for estimating a time of departure of a radio signal.

FIG. 5 schematically shows the main steps of a method 200 for estimating the time of departure $T_0$ of a radio signal transmitted by the transmitter device 21. Such a method 200 is for example implemented by the transmission device 20 described with reference to FIG. 4.

The method 200 comprises in particular a step 201 of detecting a current peak measured by the detection module 22, for example when the strength of the current becomes greater than a predetermined threshold, said current peak being caused by the transmission of the radio signal by the transmission module 21.

The method 200 also comprises a step 202 of determining the time of departure $T_0$ of the radio signal, for example by identifying an edge of the detection clock 221 corresponding to the time of the detected current peak.

As explained above, based on the time of departure $T_0$ of the radio signal, if the time of arrival $T_1$ when the signal is received is also known, it is possible to determine the distance between the transmitter device 20 and the receiver.

It should be noted that it is also possible, in a subsequent step that is not shown, to confirm, in the baseband processor, that the detected current peak did actually correspond to a message transmitted by the transmission module 21 for the purpose of calculating a time of flight of the signal in order to deduce therefrom a distance between the transmission device 20 and a receiver. For example, a period between the encoding of such a message by the baseband processor 211 and the detection of the time of departure $T_0$ of the signal by the detection module 22 should be less than a predetermined duration, for example a few microseconds.

Figure 6:
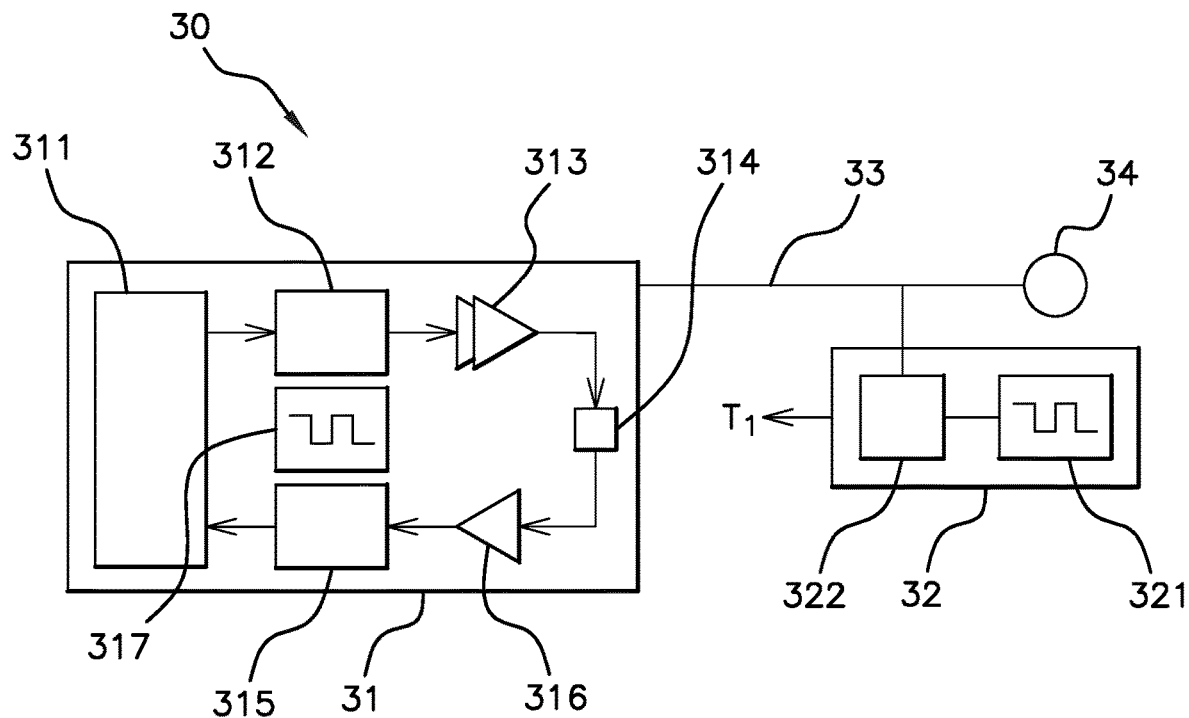
FIG. 6 shows a schematic depiction of a communication device, called "master device", designed to estimate a distance between itself and another communication device, called "slave device"

FIG. 6 shows a communication device, called "master device 30", designed to estimate the distance between itself and another communication device, called "slave device 40".

Figure 7:
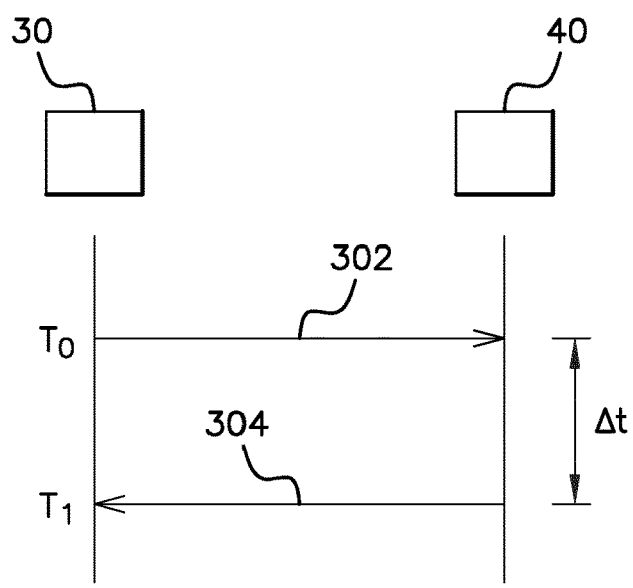
FIG. 7 shows a sequence diagram showing the messages exchanged between a master device and a slave device.

The master device 30 comprises a communication module 31 designed to exchange radio signals with the slave module 40 (cf. FIG. 7). The communication module 31 is therefore designed to transmit and receive a radio signal. The communication module 31 comprises, as is conventional, a baseband processor 311, a modulator 312, a demodulator 315, a power amplifier 313, a low-noise amplifier 316 and an antenna 314.

The modulator 312 comprises hardware and/or software means for processing the signal, considered to be known to those skilled in the art (analog and/or digital filter, local oscillator, mixer, analog-to-digital converter, signal processing processor, etc.), in order to generate an analog signal based on a binary signal supplied by the baseband processor 311. This analog signal is then amplified by the power amplifier 313 and transmitted by the antenna 314.

The demodulator 315 comprises hardware and/or software means for processing the signal, considered to be known to those skilled in the art (analog and/or digital filter, local oscillator, mixer, analog-to-digital converter, signal processing processor, etc.), in order to provide the baseband processor 311 with a binary signal based on an analog signal received at the antenna 314 and shaped by the low-noise amplifier 316.

The communication module 31 is for example clocked by a clock 317 internal to the communication module 31, called "communication clock 317". In the example under consideration, in which the communication module 31 is a Bluetooth® communication module, the frequency of this communication clock 317 is conventionally equal to 24 MHz.

The master device 30 also comprises an electric power source 34 that supplies the communication module 31 with an electric current via a supply line 33. The power consumption of the communication module 31, and therefore the strength of the electric current in the supply line 33, vary on the basis of the activities of the communication module 31.

The master device 30 also comprises a detection module 32 comprising a measuring instrument 322 for measuring the strength of the electric current flowing in the supply line 33. The detection module 32 is for example clocked by a clock, called "detection clock 321". Advantageously, the frequency of the detection clock 321 is greater than the frequency of the communication clock 317. For example, the frequency of the detection clock 321 is at least equal to 150 MHz.

As illustrated in FIG. 7, the master device 30 is configured so as to transmit (step 302) a radio signal carrying a request to the slave device 40, and to determine a time of departure $T_0$ of the radio signal carrying said request. In the example under consideration, this is a message transmitted on a signaling channel (or "advertising channel" in the literature) provided for by the BLE standard, specifically one of channels 37 (at 2402 MHz), 38 (at 2426 MHz) or 39 (at 2480 MHz).

The slave device 40 is configured so as to receive the radio signal carrying the request transmitted by the master device 30, decode this request, and transmit back (step 304) a radio signal carrying a response to the request. The response is transmitted after a predetermined response period Δt following the reception of the radio signal carrying the request. This response time Δt is fixed and known to the master device 30. In the example under consideration, the response period Δt has a value of 150 ρs. The response period Δt is small enough to consider that the distance between the master device 30 and the slave device 40 does not change during this period (in the example under consideration in which one of the devices is carried or worn by a user of a vehicle while the other device is housed on board a stationary vehicle, the movement of one device in relation to the other is of the order of 1 m/s on average).

The master device 30 is configured so as to determine a time of arrival $T_1$ of the radio signal carrying the response transmitted by the slave device 40. To this end, the detection module 32 of the master device 30 is configured so as to measure the strength of the supply current of the communication module 31. The detection module 32 is also configured so as to detect a current peak, called "current peak at reception", said current peak at reception being caused by the reception of a radio signal by the communication module 31 (the current peak at reception is caused by a greater power consumption of the various elements of the reception chain, in particular the low-noise amplifier 316, when the signal is received). For example, the current peak at reception is detected when the strength of the current measured by the measuring instrument 322 of the detection module 32 becomes greater than a predetermined threshold. To this end, the detection module 32 comprises hardware and/or software means (processors, memories, program code instructions, programmable logic circuits such as FPGAs, PLDs, etc., specialized integrated circuits such as ASICs, etc.) considered to be known to those skilled in the art in order to store and analyze measurements of the strength of the current flowing in the supply line 33.

In particular embodiments, the time of departure $T_0$ of the radio signal carrying the request is determined by detecting a current peak measured by the detection module 32, called "current peak at transmission", said current peak at transmission being caused by the transmission of the radio signal carrying the request (the current peak at transmission is caused by a greater power consumption of the various elements of the transmission chain, in particular the power amplifier 313, when the signal is transmitted). For example, the current peak at transmission is detected when the strength of the current measured by the measuring instrument 322 of the detection module 32 becomes greater than a predetermined threshold.

The time of departure $T_0$ of the radio signal carrying the request and the time of arrival $T_1$ of the radio signal carrying the response are for example determined by identifying edges of the detection clock 321 corresponding respectively to the time of detection of the current peak at transmission and to the time of detection of the current peak at reception.

The master device 30 may then be configured so as to estimate the distance between the master device 30 and the slave device 40 on the basis of the time of departure $T_0$ of the radio signal carrying the request, of the time of arrival $T_1$ of the radio signal carrying the response, and of the response period $\Delta t$. Specifically, the distance D between the master device 30 and the slave device 40 corresponds to:

$$D = c \times \frac{1}{2} \times (T_1 - T_0 - \Delta t)$$

where c is the speed of light (substantially equal to 300 000 km/s).

The master device 30 described with reference to FIG. 6 is thus able to estimate the distance between the master device 30 and the slave device 40, without there being any need to synchronize clocks between the master device 30 and the slave device 40. Specifically, the master device 30 knows or is able to determine all of the temporal parameters required to determine the time of flight of a radio signal between the master device 30 and the slave device 40. The master device 30 specifically knows the value of the response period $\Delta t$ and it is able to determine the time of departure $T_0$ and the time of arrival $T_1$ in order to determine the flight time $T_f$ of a radio signal between the master device 30 and the slave device 40:

$$T_f = \frac{1}{2} \times (T_1 - T_0 - \Delta t)$$

Figure 8:
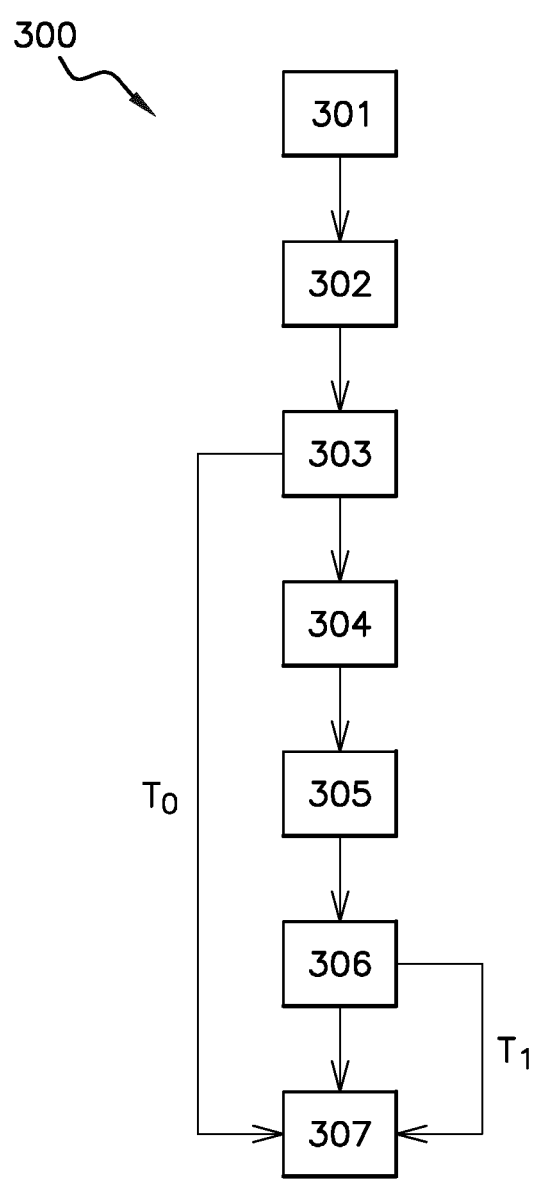
FIG. 8 shows a schematic depiction of the main steps of a method for estimating the distance between two communication devices.

FIG. 8 schematically shows the main steps of a method 300 for estimating the distance between a master device 30 and a slave device 40 as described above with reference to FIGS. 6 and 7.

The method 300 comprises the following steps:
- the master device 30 transmitting 301 a radio signal carrying a request to the slave device 40,
- determining 303 a time of departure $T_0$ of the radio signal carrying the request,
- the slave device 40 transmitting 304 a radio signal carrying a response to the master device 30, said response being transmitted after a predetermined response period $\Delta t$ following the reception of the radio signal carrying the request,
- the detection module 32 of the master device 30 detecting 305 a current peak measured by the detection module 32, called "current peak at reception", said current peak at reception being caused by the reception, by the communication module 31, of the radio signal carrying the response transmitted by the slave device 40,
- determining 306 a time of arrival $T_1$ of the radio signal carrying the response on the basis of the time of detection of the current peak at reception,
- estimating 307 the distance between the master device 30 and the slave device 40 based on the time of departure $T_0$ of the radio signal carrying the request, on the time of arrival $T_1$ of the radio signal carrying the response, and on the response period $\Delta t$.

As indicated above, it is also possible, in a step that is not shown in FIG. 8, to confirm that the current peak at reception does actually correspond to the reception of a radio signal carrying a response transmitted by the slave device 40. For example, a period between the detection of the time of arrival $T_1$ of the signal by the detection module 32 and the decoding of the response, carried by said signal, by the baseband processor 311 should be less than a predetermined duration, for example a few microseconds.

In particular modes of implementation, the time of departure $T_0$ of the radio signal carrying the request may be determined by detecting 302 a current peak measured by the detection module 32, called "current peak at transmission", said current peak at transmission being caused by the transmission of the radio signal carrying the request. In this case, it is again possible here, in a step that is not shown in FIG. 8, to confirm that the detected current peak at transmission does actually correspond to the transmission of a radio signal carrying a request to the slave device 40. For example, a period between the encoding of such a request by the baseband processor 311 and the detection of the time of departure $T_0$ of the signal by the detection module 32 should be less than a predetermined duration, for example a few microseconds.

It should be noted that the response period $\Delta t$ may possibly be subject to an accuracy error. In this case, it may be advantageous to repeat the distance estimation method 300 several times and to determine the distance on the basis of the distances estimated in the various iterations.

For example, if the response period Δt takes on average the value 150 μs, but the response period Δt may take a value between 149 μs and 151 μs, then it is advantageous to repeat the distance estimation method 300 several times, for example several hundred times, and to determine the distance between the master device 30 and the slave device 40 as being the average of the distances estimated in the various iterations. The duration for which the estimation method 300 is iterated should however remain small enough, for example less than a few tens of ms, for the variation in the distance between the master device 30 and the slave device 40 to be negligible for this duration.

The master device 30 is for example housed on board the motor vehicle, while the slave device 40 is integrated in a terminal intended to be carried or worn by a user and that allows access to said vehicle, for example a fob, a remote control, a mobile telephone, a connected watch, etc. In particular, the slave device 40 may for example correspond to a mobile telephone that supports the BLE ("Bluetooth Low Energy") standard.

If the distance between the vehicle and the terminal estimated by the master device 30 housed on board the vehicle is less than a certain predetermined distance, then access to the vehicle is authorized (for example the opening elements of the vehicle are unlocked). As has already been mentioned above, if the time of departure $T_0$ and the time of arrival $T_1$ are determined by the master device 30 using a detection clock 321 whose frequency is greater than 150 MHz, then it is possible to obtain an estimate of the distance between the vehicle and the terminal with an accuracy error of less than two meters.

According to another example, the master device 30 may be housed on board the terminal, while the slave device 40 is housed on board the vehicle.

According to yet another example, a device playing the role both of the master device 30 and of the slave device 40 is housed on board both the vehicle and the terminal. In this case, the distance between the vehicle and the terminal may be estimated both by the vehicle and by the terminal. It is then conceivable for the terminal to communicate the distance that the terminal has estimated to the vehicle, so that the vehicle adjusts the distance that the vehicle has estimated on the basis of the distance that the terminal has estimated.

The description above clearly illustrates that, through its various features and the advantages thereof, an aspect of the present invention achieves the set aims.

In particular, and as described for example with reference to FIGS. 1 to 3, an aspect of the invention makes it possible to determine a time of arrival $T_1$ of a radio signal with good accuracy even if the reception module 11 has a reception clock 117 with a frequency that is too low to obtain the desired accuracy. Specifically, an aspect of the invention makes it possible for example to determine the time of arrival $T_1$ of a radio signal on the basis of a detection clock 121 whose frequency is higher than the frequency of the reception clock 117. In the examples presented above, the frequency of the reception clock 117 at 24 MHz leads to an accuracy error of approximately 42 ns in terms of the measurement of the time of arrival $T_1$ of the radio signal (that is to say more than twelve meters of accuracy error in terms of the estimate of the distance covered by the radio signal), while a detection clock frequency greater than 150 MHz makes it possible to obtain an accuracy error of less than 7 ns in terms of the measurement of the time of arrival $T_1$ (and less than two meters of accuracy error in terms of the distance estimate).

In addition, the solution proposed by an aspect of the invention works even for relatively low received power levels of the radio signal, for example power levels of the order of −95 dBm. This is not the case for solutions from the prior art that are based on power detection, which do not work for power levels lower than −48 dBm.

In addition, the detection module 12 for detecting a current peak consumed by the reception module 11 is relatively easy to implement and inexpensive.

As has already been mentioned above, various methods may be contemplated for estimating a distance between a transmitter and a receiver of a radio signal when the time of arrival of the radio signal is able to be determined at the receiver.

An aspect of the invention in particular proposes, as described with reference to FIGS. 6 to 8, a method in which the distance is estimated on the basis of a time of departure $T_0$ of a request and of a time of arrival $T_1$ of a response that are determined by one and the same master device 30. In this case, advantageously, there is no need for clock synchronization between the master device 30 and the slave device 40.

An aspect of the invention is nevertheless also applicable to other methods that possibly assume clock synchronization. For example, if a clock of the transmitter is synchronized with a clock of the receiver, a time of departure of a radio signal transmitted by the transmitter may be determined by the transmitter and communicated to the receiver. The receiver may then determine the time of arrival of the radio signal and determine a time of flight of the radio signal, and therefore the distance covered by the radio signal, based on the received time of departure and on the determined time of arrival. According to another example, TDOA methods may make it possible to estimate the distance between a transmitter and a receiver based on the differences in times of arrival of one and the same radio signal transmitted by the transmitter and received by various receivers. In such a case, however, the clocks of the various receivers should be synchronized.

More generally, it should be noted that the modes of implementation and embodiments considered above have been described by way of non-limiting example, and that other variants may accordingly be contemplated.

An aspect of the invention is particularly readily applicable to UHF radio signals, in particular because, in this case, an estimate of the distance on the basis of the received power level (RSSI) is not particularly accurate.

More particularly, an aspect of the invention is readily applicable to the case in which the exchanged radio signals are in accordance with the BLE ("Bluetooth® Low Energy") standard, in particular because this standard is widespread in mobile telephone terminals or connected watch terminals.

However, in other examples, there is nothing to rule out considering radio signals whose frequencies are not UHF frequencies, that is to say frequencies lower than 300 MHz or greater than 3 GHz.

An aspect of the invention is particularly readily applicable to estimating the distance between a communication device housed on board a vehicle and a communication device integrated in a terminal in order to form a "hands-free" access system for accessing the vehicle. It should be noted that other applications may however be contemplated.

The invention claimed is:

1. A method for estimating a time of arrival of a radio signal received by a reception device, said reception device comprising a reception module designed to receive said radio signal, the reception device comprising a detection module configured so as to measure a current supplied by an electric power source to the reception module, and the method comprises:

detecting a current peak measured by the detection module, said current peak being caused by the reception of the radio signal by the reception module, and determining the time of arrival of the radio signal on the basis of the time of detection of the detected current peak.

2. The method as claimed in claim 1, wherein said current peak is detected when the current measured by the detection module becomes greater than a predetermined threshold.

3. A reception device for receiving a radio signal, designed to estimate a time of arrival of said radio signal, comprising a reception module designed to receive the radio signal, the reception device comprising a detection module configured so as to:

measure a current supplied by an electric power source to the reception module, detect a current peak measured by the detection module, said current peak being caused by the reception of the radio signal by the reception module, and determine the time of arrival of the radio signal on the basis of the time of detection of the detected current peak.

4. The reception device as claimed in claim 3, wherein the reception module is clocked by a reception clock, the detection module is clocked by a detection clock, which has a frequency greater than the reception clock, and the time of arrival of the radio signal is determined by identifying an edge of the detection clock corresponding to the time of detection of the detected current peak.

5. A method for estimating the distance between a master communication device and a slave communication device, each communication device comprising a communication module designed to transmit and receive a radio signal, wherein the master device furthermore comprises a detection module configured so as to measure a current supplied by an electric power source to the communication module, and the method comprises:

the master device transmitting a radio signal carrying a request to the slave device, determining a time of departure of the radio signal carrying the request, the slave device transmitting a radio signal carrying a response to the master device, said response being transmitted after a predetermined response period following the reception of the radio signal carrying the request, the detection module of the master device detecting a current peak measured by the detection module, called current peak at reception, said current peak at reception being caused by the reception, by the communication module, of the radio signal carrying the response transmitted by the slave device, determining a time of arrival of the radio signal carrying the response on the basis of the time of detection of the current peak at reception, and estimating the distance between the two communication devices based on the time of departure, on the time of arrival and on the predetermined response period.

6. A master communication device designed to estimate a distance between said master device and a slave communication device said master device comprising a communication module designed to transmit and receive a radio signal, wherein said master device comprises a detection module configured so as to measure a current supplied by an electric power source to the communication module, and the master device is configured so as to:

transmit a radio signal carrying a request to the slave device, determine a time of departure of the radio signal carrying the request, detect a current peak measured by the detection module, called current peak at reception, said current peak at reception being caused by the reception, by the communication module, of a radio signal carrying a response transmitted by the slave device after a predetermined response period following the reception of the radio signal carrying said request, determine a time of arrival of the radio signal carrying the response on the basis of the time of detection of the current peak at reception, and estimate the distance between the master device and the slave device based on the time of departure, on the time of arrival and on the predetermined response period.

7. The master device as claimed in claim 6, wherein the master device is furthermore configured so as to detect a current peak measured by the detection module, called current peak at transmission, said current peak at transmission being caused by the transmission of the radio signal carrying the request by the communication module, and to determine the time of departure of the radio signal carrying the request on the basis of the time of detection of the current peak at transmission.

8. The master device as claimed in claim 7, wherein the communication module is clocked by a clock, called communication clock, the detection module is clocked by a clock, called detection clock, which has a frequency greater than the communication clock, and the time of departure and the time of arrival are determined by identifying edges of the detection clock corresponding respectively to the time of detection of the current peak at transmission and to the time of detection of the current peak at reception.

9. The master device as claimed in claim 6, wherein the radio signals exchanged with the slave device are signals whose frequency is greater than 300 MHz.

10. The master device as claimed in claim 9, wherein radio signals exchanged with the slave device comply with a Bluetooth Low Energy communication standard.

11. An access system for accessing a motor vehicle, comprising a master device as claimed in claim 6 and a slave device, access to said vehicle being authorized when the distance between the master device and the slave device estimated by the master device is less than a predetermined distance.

12. The access system for accessing a motor vehicle as claimed in claim 11, wherein the master device is housed on board the motor vehicle and the slave device is intended to be carried or worn by a user.

13. The access system for accessing a motor vehicle as claimed in claim 11, wherein the slave device is housed on board the motor vehicle and the master device is intended to be carried or worn by a user.

14. The access system for accessing a motor vehicle as claimed in claim 12, wherein the slave device is a mobile telephone.

15. A motor vehicle comprising a master device as claimed in claim 6 for estimating the distance between the master device and a slave device intended to be carried or worn by a user, access to said vehicle being authorized for the user when the distance between the master device and the slave device estimated by the master device is less than a predetermined distance.

* * * * *